(No Model.)
2 Sheets—Sheet 1.
W. MARTIN.
PIPE COUPLING.
No. 299,661.
Patented June 3, 1884.
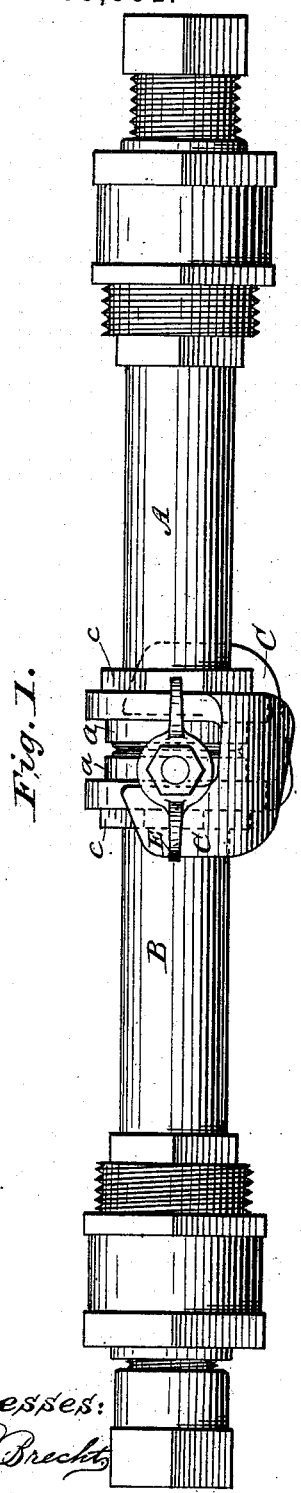
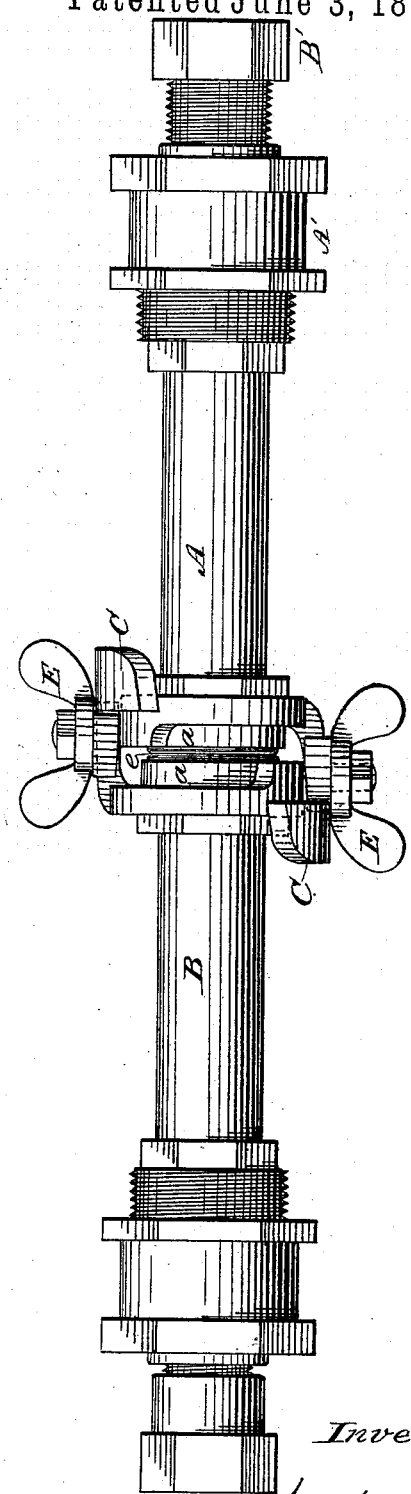
Witnesses:
Inventor:
Wm Martin (No Model.) 2 Sheets—Sheet 2.
W. MARTIN.
PIPE COUPLING.
No. 299,661. Patented June 3, 1884.
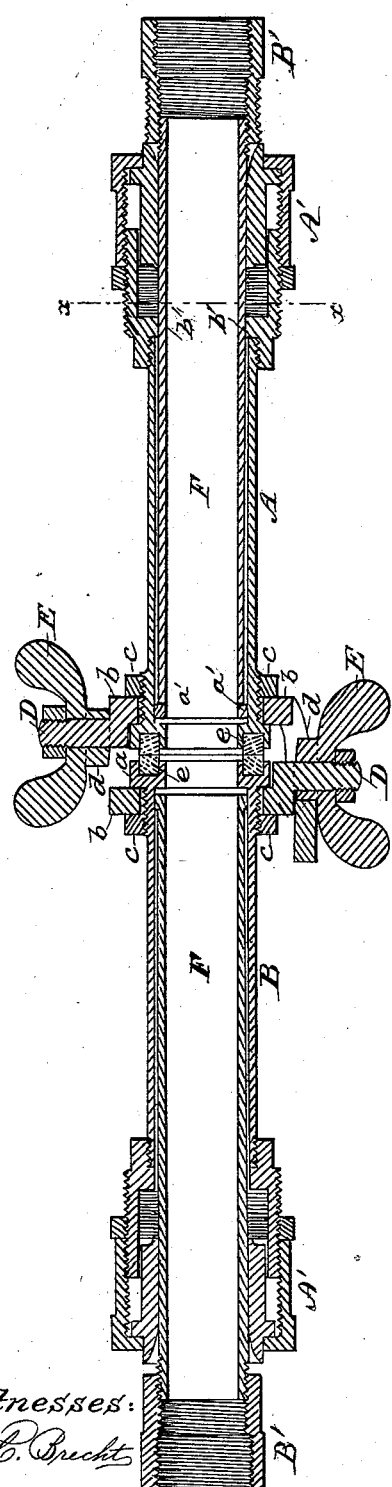
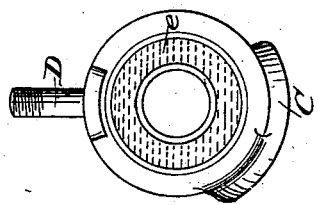
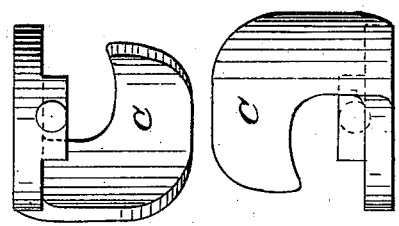
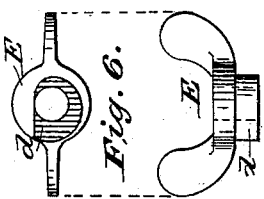
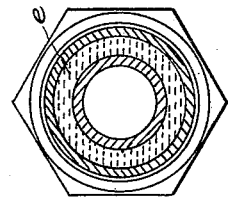
Witnesses:
Inventor:
Wm Martin

UNITED STATES PATENT OFFICE.

WILLIAM MARTIN, OF TIDIOUTE, PENNSYLVANIA.

PIPE-COUPLING.

SPECIFICATION forming part of Letters Patent No. 299,661, dated June 3, 1884.

Application filed August 3, 1883. (No model.)

*To all whom it may concern:*

Be it known that I, WILLIAM MARTIN, a citizen of the United States, residing at Tidioute, in the county of Warren and State of Pennsylvania, have invented certain new and useful Improvements in Couplings for Tubes and other Purposes, of which the following, when taken in connection with the accompanying drawings, forms a full, clear, and exact description.

The object of my invention is to provide a readily-detachable coupling for tubes, hose-pipes, and for other analogous uses, which will be safe and reliable.

My invention consists in providing the abutting-sections of the pipes or tubes to be coupled with a movable ring, or a ring capable of being turned around on the pipe-section, and in providing said rings with hooks or catches, which engage with cam thumb-nuts secured to lugs on the opposite side of the adjacent ring, so that when the sections are brought together and the hooks placed over the thumb-nuts, and the thumb-nuts turned so as to impinge against the inner faces of the hooks, the two sections of tubing will be firmly and securely drawn together and reliably held in such position.

My invention consists, further, in certain details of construction, which will be fully described, and pointed out in the claims.

Figure 1 is a side elevation. Fig. 2 is a similar view at right angles to Fig. 1. Fig. 3 is a longitudinal section of Fig. 2. Fig. 4 is an end view of the middle section, showing the packing. Fig. 5 is a plan view of the coupling-hooks. Fig. 6 is a detail view of the cam thumb screw or nut. Fig. 7 is a cross-section on line $x \, x$ of Fig. 3.

A and B are two sections of tubing, which are joined or fastened together by means of my improved coupling. The ends of the sections are made thicker and of a greater diameter than the other portions of the sections, so as to leave an offset or shoulder, against which the ring $b$ is held by the screw-nut or ring $c$, which encircles the threaded portions of the sections A and B. The ring $b$ is not forced tightly against the shoulder $a$ by the screw-nut or ring $c$, but is left loose enough so that it is free to be moved or turned round.

To one side of the ring $b$ is secured a hook, C, while the other side of said ring is provided with a screw-threaded projection, D, on which is secured a cam thumb-nut, E, the office of which is to impinge against the inner side of the hook on the adjacent section when placed thereover, and by the turning of the thumb-nuts the sections A and B are drawn together and firmly held in such position. The cam-shaped portion of the thumb-nut is clearly shown at $d$ in Figs. 3 and 6. One hook and one eccentric thumb-nut on each ring will be found sufficient for coupling small pipes or tubes; but the number may be increased to meet the requirements in coupling sections of pipes of larger diameter. The ends of the sections A and B are cut away so as to form grooves $e \, e$ therein, in which is placed any suitable packing material which will insure a tight joint between the sections when properly joined together.

To the outer ends of sections A and B are secured the stuffing-boxes A′, into which the tube-sections F F are inserted, and are free to move back and forth within the tube-sections A and B. The stuffing-box, when properly packed, prevents the escape of steam or other liquids. The outer ends of the tube-sections F F are screwed or otherwise secured to the main sections B′ of the line of pipes, while the inner ends of the tube-sections F are provided with rings or collars $a'$, which are a little less in diameter than the sections F, so that when the collars $a'$ come in contact with the rings or projections $b'$ on the inside of the sections A and B, said sections will be prevented from slipping off of the sections F F in cases where the cars are uncoupled. The collars or rings $a'$ are secured to the sections F F sufficiently strong, so as to hold the weight of the outer sections, A and B, but not so strong as to prevent their being stripped off in case a violent strain or jerk should be brought to bear on them, as in cases of derailment of the cars or other accident. Should such accident occur at any time the collars $a'$ are stripped off, the parts disconnected, and the steam is permitted to escape without injury to any one. My invention is more especially designed as a quick and reliable coupling for steam-pipes used on railway-cars for heating the same, in connection with a universal joint, for which Letters Patent were granted to me December 12, 1882, No. 268,917; but it is obvious that its use is well adapted for the coupling of all kinds of joints, whether applied to hollow or solid sections.

Having thus described my invention, what I claim, and desire to secure by Letters Patent, is—

1. A coupling for pipes and tubes, consisting of rings loosely secured to the ends of the sections to be joined or coupled together, said rings being provided with a hook and cam thumb-nuts, the hooks being adapted to engage with the thumb-nuts of the adjacent sections, and the sections drawn together by the impingement of the thumb-nuts against the inner faces of the hooks, as set forth.

2. As a means for coupling pipes and tubes, the rings $b$, provided with hooks C and cam-nuts E, said rings being attached to the ends of the sections to be coupled, and the hooks of one section adapted to engage with the thumb-nuts of the adjacent section, as set forth.

3. The combination of the sections A and B, provided with the rings $b$, hooks C, and cam thumb-nuts E, with the packing $e$, as and for the purpose set forth.

In testimony that I claim the foregoing as my invention I hereby affix my signature in the presence of two witnesses.

WM. MARTIN.

Witnesses:
S. C. PARSHALL,
D. S. THOMPSON.